(No Model.)

L. SCOFIELD.
CORN PLANTER.

No. 252,808.  Patented Jan. 24, 1882.

Witnesses.
Henry Frankfurter
C. T. Hall

Inventor.
Levi Scofield
per. Hill & Dixon
Attorneys.

UNITED STATES PATENT OFFICE.

LEVI SCOFIELD, OF CEDAR RAPIDS, IOWA.

CORN-PLANTER.

SPECIFICATION forming part of Letters Patent No. 252,808, dated January 24, 1882.

Application filed August 30, 1881. (No model.)

*To all whom it may concern:*

Be it known that I, LEVI SCOFIELD, of Cedar Rapids, in the county of Linn and State of Iowa, have invented a certain new and useful Improvement in Corn-Planters; and I do hereby declare that the following is a full, clear, and exact description and specification thereof, reference being had to the accompanying drawings, in which—

Figure 1:
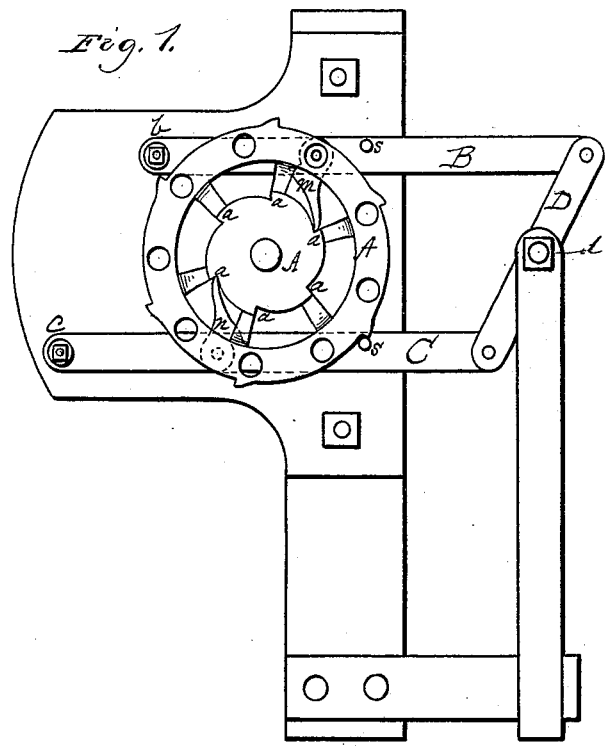
Figure 2:
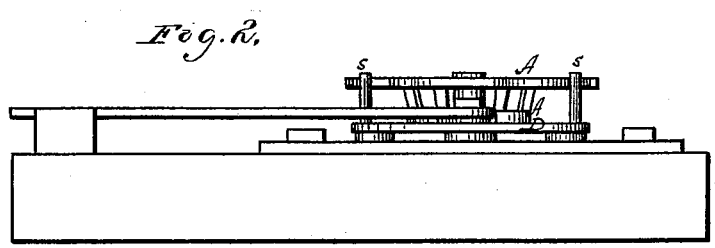

Figure 1 is a top plan view, and Fig. 2 a side elevation.

Similar letters of reference indicate the same parts.

This invention relates to that class of corn-planters in which an intermittently-revolving horizontal seed-plate receives the separate charges of corn in pockets, carries them around to the top of the seed-tube, and drops them successively therein, and more particularly to that subclass of said corn-planters in which such seed-plate is operated by dogs or pawls connected to a reciprocating bar and acting in opposite directions, so as to rotate the seed-plate through an arc equal to the distance from one seed-pocket to another at each forward or back stroke of the actuating-bar.

The invention consists in a simple and effective combination of parts for communicating the movement of the bar to the seed-plate by means of the pawls or dogs, so as to do away with all unnecessary complication of mechanism, obtain a cheap and durable structure, and apply the pawls to the seed-plate with an equal and uniform movement and power.

In the drawings, A represents the seed-plate, which may be of any suitable form and construction and mounted in any suitable manner.

B represents a bar pivoted to any suitable support at *b*, so as to swing horizontally on said pivot at one side of the seed-plate.

C represents a similar bar, similarly pivoted at *c* at the other side of the seed-plate.

D represents a connecting-bar, which unites the free ends of the bars B C, and to which the actuating-bar is articulated at any suitable point, preferably at *d*, the object of the connecting-bar being to cause the two bars B and C always to move in the same direction through equal arcs.

*m* represents a pawl or dog (preferably a spring-pawl) attached to the bar B, and working against the ratchet-teeth *a a* in the edge of the seed-plate.

*n* represents a similar pawl or dog attached to the bar C, and working in the opposite direction against said ratchet-teeth, and at a point on the seed-plate diametrically opposite to the point where the pawl *m* engages with said teeth; and *s s* represent stops, of any suitable form, attached to or connected with the bars B C, and arranged to bear alternately against the seed-plate at the end of each of its movements, to hold it from moving too far and from accidental displacement.

All of the parts above described may be of any suitable size and shape that will enable them to accomplish their functions in the combination. The pawls or dogs may operate against the upper edge of the seed-plate, or against any part of the seed-plate, or any extension thereof below said upper edge, or against a rotating carrying-plate, or a shaft upon which said seed-plate may be mounted, all these modifications being immaterial to the purposes and results of the invention. It is vital to the invention, however, that the two pawls, acting alternately in opposite directions against the seed-plate or its support, should have a substantially equal range of movement; otherwise one of them will move the seed-plate through a longer arc than the other, and a uniform feed will not result. To this end, therefore, I attach the pawls *m n* to the bars B C at a substantially equal distance from the respective pivots *b c*, and I also apply the motive power to the bars B C at a substantially equal distance from said pivots *b c*, by which arrangement and construction the two pawls will move through exactly equal spaces at equal times, and the movements of the seed-plate will be measured by uniformly equal arcs.

It is obvious that if an imaginary line, *x x*, be drawn through the axis of rotation of the seed-plate perpendicular to the parallel bars B C, it will bisect said bars at unequal distances from the pivots *b c*, the difference being substantially equal to the diameter of the seed-plate or other part through the points where the pawls engage with it.

It is further obvious that as an equivalent of this construction the motive power may be applied to the bars B C at unequal distances from their respective pivots, and the pawls also applied at unequal distances from said pivots, the pawl being proportionately farthest from the pivot on that bar to which the power is applied nearest to the pivot, whereby the same result of an equal and uniform movement of the two pawls will be attained.

The connection between the two bars B C may be effected by any other means than the bars D, provided it be such as to effect substantially the same result upon the movements of said two bars.

It is further obvious that both bars B C may be arranged on the same side of the seed-plate or its vertical axis, one of the pawls being in the form of a hook to draw the ratchet-teeth around at one side of the seed-plate and the other in the form of a dog to push them around at the other side, the pawls being arranged on the bars, and the motive power applied thereto in the manner above described.

The pawls or pivots or means of attaching the actuating-bar may each or all be made adjustable along the bars B C by providing different holes or points of attachment, so as to adjust one size of seed-plate to different machines in which the movement of the actuating-bar is not the same, or, conversely, to adjust the movement of the actuating-bar to different forms or sizes of seed-plate.

Having thus described my invention, I claim as new—

1. The combination of the rotary seed-plate with the two pivoted bars B C and their pawls, said pawls and the points of applying the motive power being arranged substantially as described, whereby the movements of the pawls are equalized, in the manner herein set forth.

2. The combination of the rotary seed-plate with the two pivoted bars B C, their pawls, and the two stops, the movements of the pawls and stops being equalized, substantially in the manner described.

LEVI SCOFIELD.

Witnesses:
L. HILL,
C. T. HALL.